United States Patent
Kajita et al.

(10) Patent No.: US 11,634,339 B2
(45) Date of Patent: Apr. 25, 2023

(54) OXIDE ION CONDUCTOR AND ELECTROCHEMICAL DEVICE

(71) Applicant: KABUSHIKI KAISHA TOYOTA CHUO KENKYUSHO, Nagakute (JP)

(72) Inventors: Seiji Kajita, Nagakute (JP); Nobuko Ohba, Nagakute (JP); Akitoshi Suzumura, Nagakute (JP); Shin Tajima, Nagakute (JP); Ryoji Asahi, Nagakute (JP)

(73) Assignee: KABUSHIKI KAISHA TOYOTA CHUO KENKYUSHO, Nagakute (JP)

( * ) Notice: Subject to any disclaimer, the term of this patent is extended or adjusted under 35 U.S.C. 154(b) by 367 days.

(21) Appl. No.: 16/954,872

(22) PCT Filed: Feb. 12, 2019

(86) PCT No.: PCT/JP2019/004768
§ 371 (c)(1),
(2) Date: Jun. 17, 2020

(87) PCT Pub. No.: WO2019/159857
PCT Pub. Date: Aug. 22, 2019

(65) Prior Publication Data
US 2021/0087069 A1 Mar. 25, 2021

(30) Foreign Application Priority Data

Feb. 15, 2018 (JP) .............................. JP2018-024616
Jan. 18, 2019 (JP) .............................. JP2019-007317

(51) Int. Cl.
*C01F 11/00* (2006.01)
*C01F 11/02* (2006.01)
*G01N 27/416* (2006.01)
*H01M 8/1246* (2016.01)

(52) U.S. Cl.
CPC ............ *C01F 11/02* (2013.01); *G01N 27/416* (2013.01); *H01M 8/1246* (2013.01)

(58) Field of Classification Search
CPC ..... C01F 11/02; G01N 24/416; H01M 8/1246
See application file for complete search history.

(56) References Cited

PUBLICATIONS

Gellings et al., Handbook of solid state electrochemistry (CRC press, 1997), pp. 196.
May 14, 2019 International Search Report issued in International Patent Application No. PCT/JP2019/004768.
May 14, 2019 Written Opinion issued in International Patent Application No. PCT/JP2019/004768.

(Continued)

*Primary Examiner* — Zulmariam Mendez
(74) *Attorney, Agent, or Firm* — Oliff PLC

(57) ABSTRACT

An oxide ion conductor has a $X_3Z_2(TO_4)_3$ structure, where X is a divalent metal element, Z is a trivalent metal element, and T is a tetravalent metal element, and has a composition expressed by $(X_{1-x}A_x)_3(Z_{1-y}B_y)_2(T_{1-z}C_z)_3O_{12+\delta}$ where the element X is Ca, Fe, Gd, Ba, Sr, Mn, and/or Mg, the element Z is Al, Cr, Fe, Mn, V, Ga, Co, Ni, Ru, Rh, and/or Ir, the element T is Si and/or Ge, an element A is La, Pr, Nd, Sm, Eu, Gd, Tb, Dy, Ho, Er, Tm, Yb, Lu, and/or Sr, an element B is Zn, Mn, Co, Ru, and/or Rh, and an element C is Si, Al, Ga, and/or Sn, $0 \leq x \leq 0.2$, $0 \leq y \leq 0.2$, and $0 \leq z \leq 0.2$ are satisfied, and $\delta$ is a value securing electrical neutrality.

4 Claims, 1 Drawing Sheet

(56) References Cited

PUBLICATIONS

Feb. 21, 2020 International Preliminary Report on Patentability issued in International Patent Application No. PCT/JP2019/004768.
Desvignes et al., "Flux Growth of Single Magnetic Sublattice Antiferromagnetic Garnets Ca3Fe2Ge3O12 and Ca3Mn2Ge3O12", Mat. Res. Bul., 1978, vol. 13, No. 2, pp. 141-146.
Riebling, "Growth Of Ca3Fe2Ge3O12 And Ca3Fe(Al, Cr)Ge3O12 Garnets in Molten Bismuth Germanate Glasses", Mat. Res. Bul., 1975, vol. 10, No. 11, pp. 1143-1150.
Wang et al., "Pressure-induced phase transformation and amorphization in Ca3Fe2Si3O12: a high pressure X-ray diffraction study", Journal of Physics and Chemistry of Solids, 1999, vol. 60, No. 4, pp. 441-444.
Rotman et al., "Defect property correlations in garnet crystals. II. Electrical conductivity and optical absorption in Ca3Al2Ge3O12", Journal of Applied Physics, 1985, vol. 57, No. 12, pp. 5320-5324.
De et al. "Comparing molecules and solids across structural and alchemical space", Physical Chemistry Chemical Physics, May 28, 2016, vol. 18, No. 20, pp. 13754-13769.
Kajita et al. "A Universal 3D Voxel Descriptor for Solid-State Material Informatics with Deep Convolutional Neural Networks", Scientific Reports, Dec. 5, 2017, 7(1), pp. 1-9.
Jun. 1, 2021 Office Action issued in Japanese Patent Application No. 2019-007317.

OXIDE ION CONDUCTOR AND ELECTROCHEMICAL DEVICE

FIELD OF THE INVENTION

The present invention relates to oxide ion conductors and electrochemical devices, more specifically relates to a novel oxide ion conductor including an oxide having a $X_3Z_2(TO_4)_3$ structure, where X is a divalent metal element, Z is a trivalent metal element, and T is a tetravalent metal element, and relates to an electrochemical device including the oxide ion conductor.

BACKGROUND OF THE INVENTION

The term "oxide ion conductor" refers to a solid material in which oxide ion ($O^{2-}$) preferentially diffuses. The oxide ion conductor is used as a solid electrolyte of an electrochemical device such as a solid-oxide fuel cell (SOFC), an oxygen gas sensor, and an exhaust gas purification element using an electrochemical reaction. Yttria-stabilized zirconia (YSZ) containing about 8 mol % $Y_2O_3$ is currently used widely as the oxide ion conductor.

YSZ exhibits high oxide ion conductivity of $10^{-2}$ S/cm or more at high temperature (700° C. or higher) (Nonpatent Literature 1), and is used at an operating temperature of around 1000° C. However, there is a demand for lowering operating temperature of electrochemical devices in light of suppressing deterioration of a peripheral member or improving energy utilization efficiency. In particular, there is a great demand for a material having high oxide ion conductivity in an intermediate temperature range from 300° C. to 500° C.

For example, scandia ($Sc_2O_3$) stabilized zirconia (ScSZ) is investigated as an electrolyte allowing low-temperature operation of SOFC. A lanthanum gallate ($LaGaO_3$)-based electrolyte allows significant lowering of operating temperature and is thus used in a household fuel cell while being considerably lower in strength than zirconia. A ceria-based electrolyte is also tentatively used. However, none of such electrolytes other than YSZ is sufficiently successful due to low strength, low redox resistance, or high cost.

CITATION LIST

Nonpatent Literature

Nonpatent Literature 1: P. J. Gellings and H. Bouwmeester, Handbook of solid state electrochemistry (CRC press, 1997), pp. 196.

SUMMARY OF THE INVENTION

An object of the present invention is to provide a novel oxide ion conductor that can be operated at low temperature.

Another object of the present invention is to provide an electrochemical device including such an oxide ion conductor.

To achieve the object, an oxide ion conductor according to the present invention includes an oxide having a $X_3Z_2(TO_4)_3$ structure, where X is a divalent metal element, Z is a trivalent metal element, and T is a tetravalent metal element, and has a composition expressed by Formula (1)

$$(X_{1-x}A_x)_3(Z_{1-y}B_y)_2(T_{1-z}C_z)_3O_{12+\delta} \quad (1)$$

where the element X is at least one element selected from a group consisting of Ca, Fe, Gd, Ba, Sr, Mn, and Mg, the element Z is at least one element selected from a group consisting of Al, Cr, Fe, Mn, V, Ga, Co, Ni, Ru, Rh, and Ir, the element T is at least one element selected from a group consisting of Si and Ge, an element A is different from the element X and at least one element selected from a group consisting of La, Pr, Nd, Sm, Eu, Gd, Tb, Dy, Ho, Er, Tm, Yb, Lu, and Sr, an element B is different from the element Z and at least one element selected from a group consisting of Zn, Mn, Co, Ru, and Rh, an element C is different from the element T and at least one element selected from a group consisting of Si, Al, Ga, and Sn, $0 \le x \le 0.2$, $0 \le y \le 0.2$, and $0 \le z \le 0.2$ are satisfied, and $\delta$ is a value securing electrical neutrality.

The electrochemical device according to the present invention is summarized by including the oxide ion conductor of the present invention.

The oxide ion conductor having the $X_3Z_2(TO_4)_3$ structure has ion conductivity substantially equal to ion conductivity of YSZ at 700° C. and several times to several tens of times as high as that of YSZ in a low temperature range from 400 to 500° C. It is therefore possible to reduce operating temperature by applying the oxide ion conductor to an electrochemical device such as SOFC. Such low temperature operation expands a range of the selection of materials used for a peripheral member. The electrochemical device is therefore hopefully improved in performance, reduced in cost, and improved in durability.

DETAILED DESCRIPTION OF THE PREFERRED EMBODIMENTS

Figure 1:
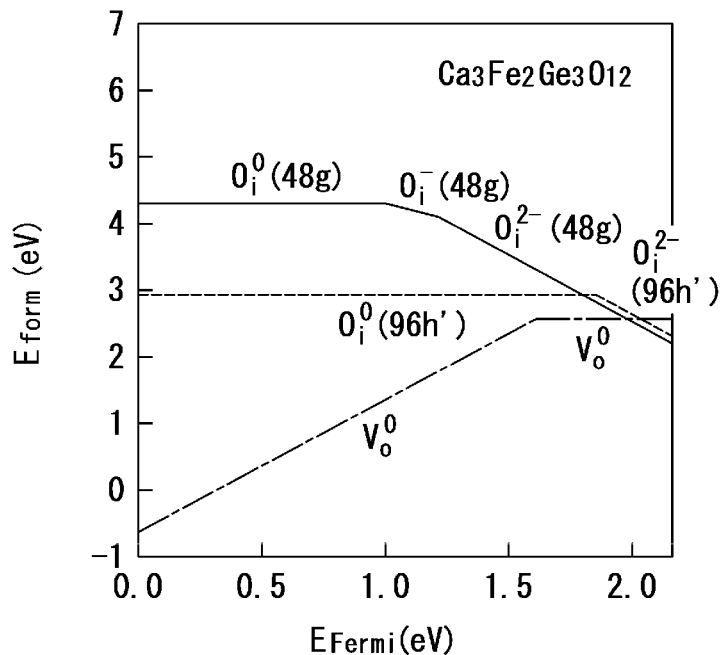
FIG. 1 illustrates a relationship between formation energy and the Fermi level of $Ca_3Fe_2Ge_3O_{12}$.

One embodiment of the present invention will now be described in detail.

[1. Oxide Ion Conductor]

The oxide ion conductor of the present invention includes an oxide having a $X_3Z_2(TO_4)_3$ structure, where X is a divalent metal element, Z is a trivalent metal element, and T is a tetravalent metal element.

[1.1. Crystal Structure]

The oxide ion conductor of the present invention mainly contains a phase having the $X_3Z_2(TO_4)_3$ structure (so-called garnet structure), but may further contain a hetero phase depending on types and amount of the main constituent elements (elements X, Z, and T) and dopants (elements A, B, and C). The oxide having the $X_3Z_2(TO_4)_3$ structure belongs to a cubic system. The elements X, Z, and T are coordinated by oxygen dodecahedrally, octahedrally, and tetrahedrally, respectively.

Although various oxides having the $X_3Z_2(TO_4)_3$ structure have been known, it is not known that the oxides each serve as an oxide ion conductor. Further, it is not known that ion conductivity of the oxide having the $X_3Z_2(TO_4)_3$ structure is improved by addition of an appropriate dopant (element A, B, or C).

[1.2. Composition (1)]

The oxide ion conductor of the present invention has a composition expressed by Formula (1):

$$(X_{1-x}A_x)_3(Z_{1-y}B_y)_2(T_{1-z}C_z)_3O_{12+\delta} \tag{1}$$

where an element X is at least one element selected from a group consisting of Ca, Fe, Gd, Ba, Sr, Mn, and Mg, an element Z is at least one element selected from a group consisting of Al, Cr, Fe, Mn, V, Ga, Co, Ni, Ru, Rh, and Ir, an element T is at least one element selected from a group consisting of Si and Ge, an element A is different from the element X and at least one element selected from a group consisting of La, Pr, Nd, Sm, Eu, Gd, Tb, Dy, Ho, Er, Tm, Yb, Lu, and Sr, an element B is different from the element Z and at least one element selected from a group consisting of Zn, Mn, Co, Ru, and Rh, an element C is different from the element T and at least one element selected from a group consisting of Si, Al, Ga, and Sn, $0 \leq x \leq 0.2$, $0 \leq y \leq 0.2$, and $0 \leq z \leq 0.2$ are satisfied, and $\delta$ is a value securing electrical neutrality.

[1.2.1. Element X]

The element X is located on the 24c-site (dodecahedral site) in cubic garnet. In the present invention, the element X is a divalent metal element, and consists of one of Ca, Fe, Gd, Ba, Sr, Mn, and Mg. Any of such elements can occupy the 24c-site, and any oxide containing the element exhibits relatively high ion conductivity, and is thus preferable as the element X. The oxide ion conductor may contain any one or at least two of the elements X.

In the present invention, the term "metal element" contains semimetals such as Si and Ge.

[1.2.2. Element Z]

The element Z is located on the 16a-site (octahedral site) in cubic garnet. In the present invention, the element Z is a trivalent metal element, and consists of one of Al, Cr, Fe, Mn, V, Ga, Co, Ni, Ru, Rh, and Ir. Any of such elements can occupy the 16a-site, and any oxide containing the element exhibits relatively high ion conductivity, and is thus preferable as the element Z. The oxide ion conductor may contain any one or at least two of the elements Z.

[1.2.3. Element T]

The element T is located on the 24d-site (tetrahedral site) in the cubic garnet. In the present invention, the element T is a tetravalent metal element, and consists of one of Si and Ge. Any of such elements can occupy the 24d-site, and any oxide containing the element exhibits relatively high ion conductivity, and is thus preferable as the element T. The oxide ion conductor may contain one or both of the elements T.

[1.2.4. Element A]

The element A is a dopant to be substituted for the element X. In the present invention, the element A is different from the element X and one of La, Pr, Nd, Sm, Eu, Gd, Tb, Dy, Ho, Er, Tm, Yb, Lu, and Sr. The oxide ion conductor may contain any one or at least two of the elements A.

Any of the elements A has an ion radius similar to that of the element X and thus can be substituted for the element X. When the element A has a valence different from that of the element X, oxygen vacancy or interstitial oxygen is introduced in a crystal lattice, and thus the oxide exhibits high ion conductivity compared with an oxide containing no element A.

The element A preferably satisfies that ion radius difference between the element A and the element X is 15% or less (Hume-Rothery rules). The ion radius difference is preferably 12% or less, more preferably 10% or less.

The term "ion radius difference between the element A and the element X $(\Delta R_{A-X})$" refers to a value expressed by Formula (2.1).

$$\Delta R_{A-X}(\%) = |R_A - R_X| \times 100 / R_X \tag{2.1}$$

where $R_A$ is ion radius of the element A, and $R_X$ is ion radius of the element X.

[1.2.5. Element B]

The element B is a dopant to be substituted for the element Z. In the present invention, the element B is different from the element Z and one of Zn, Mn, Co, Ru, and Rh. The oxide ion conductor may contain any one or at least two of the elements B.

Any of the elements B has an ion radius similar to that of the element Z and thus can be substituted for the element Z. When the element B has a valence different from that of the element Z, oxygen vacancy or interstitial oxygen is introduced in a crystal lattice, and thus the oxide exhibits high ion conductivity compared with an oxide containing no element B.

The element B preferably satisfies that ion radius difference between the element B and the element Z is 15% or less (Hume-Rothery rules). The ion radius difference is preferably 12% or less, and more preferably 10% or less.

The term "ion radius difference between the element B and the element Z $(\Delta R_{B-Z})$" refers to a value expressed by Formula (2.2).

$$\Delta R_{B-Z}(\%) = |R_B - R_Z| \times 100 / R_Z \tag{2.2}$$

where $R_B$ is ion radius of the element B, and $R_Z$ is ion radius of the element Z.

[1.2.6. Element C]

The element C is a dopant to be substituted for the element T. In the present invention, the element C is different from the element T and one of Si, Al, Ga, and Sn. The oxide ion conductor may contain any one or at least two of the elements C.

Any of the elements C has an ion radius similar to that of the element T and thus can be substituted for the element T. When the element C has a valence different from that of the element T, oxygen vacancy or interstitial oxygen is introduced in a crystal lattice, and thus the oxide exhibits high ion conductivity compared with an oxide containing no element C.

The element C preferably satisfies that ion radius difference between the element C and the element T is 15% or less (Hume-Rothery rules). The ion radius difference is preferably 12% or less, and more preferably 10% or less.

The term "ion radius difference between the element C and the element T $(\Delta R_{C-T})$" refers to a value expressed by Formula (2.3).

$$\Delta R_{C-T}(\%) = |R_C - R_T| \times 100 / R_T \tag{2.3}$$

where $R_C$ is ion radius of the element C, and $R_T$ is ion radius of the element T.

[1.2.7. x]

The subscript x indicates the amount of the element A substituted for the element X. The oxide ion conductor of the present invention exhibits relatively high ion conductivity even if the conductor contains no element A. In other words, x may be zero. The ion conductivity, however, typically increases with an increase in x. Thus, to achieve a certain effect, x is preferably 0.01 or more, more preferably 0.03 or more, and even more preferably 0.05 or more.

On the other hand, if x becomes excessively large, the element A may not be wholly substituted for the element X, leading to hetero phase precipitation. Hence, x is preferably 0.2 or less, more preferably 0.15 or less, and even more preferably 0.1 or less.

[1.2.8. y]

The subscript y indicates the amount of the element B substituted for the element Z. The oxide ion conductor of the present invention exhibits relatively high ion conductivity even if the conductor contains no element B. In other words, y may be zero. The ion conductivity, however, typically increases with an increase in y. Thus, to achieve a certain effect, y is preferably 0.01 or more, more preferably 0.03 or more, and even more preferably 0.05 or more.

On the other hand, if y becomes excessively large, the element B may not be wholly substituted for the element Z, leading to hetero phase precipitation. Hence, y is preferably 0.2 or less, more preferably 0.15 or less, and even more preferably 0.1 or less.

[1.2.9. z]

The subscript z indicates the amount of the element C substituted for the element T. The oxide ion conductor of the present invention exhibits relatively high ion conductivity even if the conductor contains no element C. In other words, z may be zero. The ion conductivity, however, typically increases with an increase in z. Thus, to achieve a certain effect, z is preferably 0.01 or more, more preferably 0.03 or more, and even more preferably 0.05 or more.

On the other hand, if z becomes excessively large, the element C may not be wholly substituted for the element T, leading to hetero phase precipitation. Hence, z is preferably 0.2 or less, more preferably 0.15 or less, and even more preferably 0.1 or less.

[1.2.10. δ]

If the oxide ion conductor contains no dopant (element A, B, or C), δ is ideally zero. However, oxygen vacancy or interstitial oxygen may be actually generated even if the conductor contains no dopant. When a dopant (element A, B, or C) having a different valence from that of the main constituent element (element X, Z, or T) is added, oxygen vacancy or interstitial oxygen is typically generated to maintain electrical neutrality. An expression 2 δ=3(a−2)x+ 2(b−3)y+3(c−4)z is formally established, where a, b, and c are valences of the elements A, B, and C, respectively.

[1.3. Composition (2)]

The oxide ion conductor of the present invention preferably has a composition expressed by Formula (1.1).

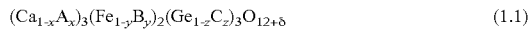

$$(Ca_{1-x}A_x)_3(Fe_{1-y}B_y)_2(Ge_{1-z}C_z)_3O_{12+\delta} \quad (1.1)$$

where

A is at least one element selected from a group consisting of La, Pr, Nd, Sm, Eu, Gd, Tb, Dy, Ho, Er, Tm, Yb, Lu, and Sr, B is at least one element selected from a group consisting of Zn, Mn, Co, Ru, and Rh, C is at least one element selected from a group consisting of Si, Al, Ga, and Sn, $0 \leq x \leq 0.2$, $0 \leq y \leq 0.2$, and $0 \leq z \leq 0.2$ are satisfied, and δ is a value securing electrical neutrality.

In Formula (1.1), since details of A, B, C, x, y, z, and δ are the same as those in Formula (1), duplicated description is omitted.

The composition expressed by Formula (1.1) is stable and exhibits high oxide ion conductivity at high temperature (about 900° C.) in the atmosphere. Specifically, since the oxide ion conductor is mainly composed of the elements such as Ca, Fe, and Ge that are each less movable than oxide ion, the structure of the oxide ion conductor is less likely to be broken due to migration of any other element than the oxide ion.

[1.4. Application]

The oxide ion conductor of the present invention can be used for solid electrolytes of various electrochemical devices. Examples of the electrochemical devices, to which the present invention is applied, include the following.

(a) Solid-oxide fuel cell (SOFC).

(b) Oxygen gas sensor.

(c) Exhaust gas purification element.

(d) Solid-oxide electrolysis cell (SOEC).

[2. Method for Manufacturing Oxide Ion Conductor]

The oxide ion conductor of the present invention can be manufactured by (a) mixing raw materials into a predetermined composition, (b) calcinating the raw material mixture under a predetermined condition, and (c) appropriately pulverizing the calcinated powder, and then forming and sintering the pulverized, calcinated powder.

The manufacturing conditions are preferably optimally selected in accordance with a target composition without limitation.

[3. Effects]

YSZ is now widely used as the solid electrolyte used for the electrochemical devices such as SOFC. However, YSZ has the following difficulties.

(a) Ion conductivity is still insufficient.

(b) Activation energy for conduction is relatively high (about 100 kJ/mol), and thus ion conductivity drastically decreases at less than 700° C.

(c) Since YSZ is in general used at a high temperature of about 800 to 1000° C., a peripheral member of YSZ must include a material that has high heat resistance and does not react with YSZ in an operating temperature range.

To overcome such difficulties, there are provided some methods for lowering the operating temperature of the electrochemical device. For example, the methods for lowering the operating temperature of SOFC include:

(a) forming an electrolyte into an extremely thin film;

(b) decreasing overvoltage using a high-performance electrode; and (c) developing a novel material having a high ion conductivity.

Of these, the method of forming an electrolyte into a thin film and the method of exploring an electrode material are each not an essential solution. Although the scandia ($Sc_2O_3$)-stabilized zirconia (ScSZ), the lanthanum gallate ($LaGaO_3$)-based electrolyte, and the ceria-based electrolyte are proposed as electrolytes other than YSZ, any of such electrolytes is less successful due to low strength, low redox resistance, or high cost.

In contrast, the oxide ion conductor having the $X_3Z_2(TO_4)_3$ structure has ion conductivity substantially equal to that of YSZ at 700° C. Specifically, YSZ has conductivity of $10^{-2}$ to $10^{-3}$ S/cm at 700° C. On the other hand, $Ca_{2.4}La_{0.6}Fe_2Ga_3O_{12}$ as one oxide ion conductor of the present invention has ion conductivity of $0.83 \times 10^{-2}$ S/cm at 700° C.

The oxide ion conductor having the $X_3Z_2(TO_4)_3$ structure has ion conductivity several times to several tens of times as high as that of YSZ in a low temperature range from 400 to 500° C. Specifically, YSZ has conductivity of $5.0 \times 10^{-4}$ S/cm at 500° C. and $3.0 \times 10^{-3}$ S/cm at 400° C. On the other hand, $Ca_{2.4}La_{0.6}Fe_2Ga_3O_{12}$ as one oxide ion conductor of the present invention has ion conductivity of $2.1 \times 10^{-3}$ S/cm at 500° C. and $1.1 \times 10^{-3}$ S/cm at 400° C.

It is therefore possible to reduce the operating temperature by applying the oxide ion conductor to an electrochemical device such as SOFC. Such low temperature operation expands a range of the selection of materials used for a peripheral member. The electrochemical device is therefore hopefully improved in performance, reduced in cost, and improved in durability.

The oxide having the $X_3Z_2(TO_4)_3$ structure exhibits high ion conductivity when the respective elements X, Z, and T are specific elements. This is because atomic arrangement, physical property values, and an ion conduction path of such an oxide have features similar to those of any known oxide ion conductor. Evaluation methods of the conductivity specifically include the following.

(a) A method of evaluating the conductivity by the Kernel Ridge Regression with smooth overlap of atomic positions (reference 1) as a descriptor determining similarity of atomic arrangement.

(b) A method of evaluating the conductivity by the partial least squares regression with a physical property value, specifically density or a melting point considered to be importantly in correlation with conductivity, as the descriptor.

(c) A method of evaluating the conductivity by the convolutional neural networks with reciprocal 3D voxel space (reference 2) determining similarity of an ion conductivity path as a descriptor.

Results of such three types of ion conductivity regression have revealed that the oxide having the $X_3Z_2(TO_4)_3$ structure is characterized by exhibiting conductivity similar to that of the existing oxide ion conductor such as YSZ.

Reference 1: S. De, A. P. Bartok, G. Csanyi, and M. Ceriotti, Phys. Chem. Chem. Phys. 18, 13754(2016).

Reference 2: Kajita, S., Ohba, N., Jinnouchi, R., & Asahi, R., (2017), Scientific reports, 7(1), 16991.

EXAMPLES

Examples 1 to 6 and Comparative Example 1

[1. Sample Preparation]
[1.1. Examples 1 to 6]

Samples were synthesized by a typical solid reaction method. The used raw materials were oxides or carbonates of commercially available reagents. Nominal compositions were as follows. In this case, each sample was synthesized in a stoichiometry composition and an interstitial oxygen type or oxygen vacancy type composition.

(a) $Ca_3Fe_2Ge_3O_{12}$ (Example 1).
(b) $Ca_{2.4}La_{0.6}Fe_2Ge_3O_{12}$ (Examples 2 to 4).
(c) $Ca_3Fe_2Ge_{2.4}Al_{0.6}O_{12}$ (Examples 5 and 6).

The raw materials were weighed in a total amount of 10 g and put in a 250 ml polymer pot. Further, 80 ml of zirconia balls 5 mm in diameter and 80 ml of ethanol as a solvent were added and mixed with the raw materials for 20 h by a ball mill. After mixing, slurry was collected, and ethanol was evaporated by a rotary evaporator, and remaining powder was collected. The resultant powder was calcinated for five hours at 1000° C. in the atmosphere by a muffle furnace.

The calcinated powder was pulverized in an alumina mortar until coarse powder was entirely pulverized (until grain size was reduced to several micrometers or less). The pulverized powder was die-molded (into roughly 12 mm in diameter and 2 mm in thickness). The molded body was placed on an alumina boat and sintered in a box furnace. The sintering was performed for one hour at 1200 to 1350° C. in oxygen.

[1.2. Comparative Example 1]

Commercially available YSZ (8 mol % $Y_2O_3$) was directly subjected to a test.

[2. Test Method]
[2.1. Density]

Density of the sintered body was evaluated in terms of bulk density.

[2.2. XRD]

A crystal phase of each sample was identified by X-ray diffractometry (XRD).

[2.3. Compositional Analysis]

A composition was determined in detail by high-frequency induction coupling plasma emission analysis (ICP) method. The composition was also simply analyzed by fluorescent X-ray analysis.

[2.4. Ion Conductivity]

Ion conductivity was measured by an impedance method (Cole-Cole plot). A surface of each of the sintered bodies was polished by pieces of sandpaper Nos. 500 to 1000 for removal of a surface layer and smoothing. Subsequently, a Pt electrode 500 nm thick was formed by sputter. After the Pt electrode was formed, a heat treatment was performed at 950° C. for 1 h in the atmosphere, so that a Pt wire was attached to the Pt electrode by Pt paste.

The samples were each placed in a tubular furnace in the atmosphere. The electrode was connected to an LCR meter (LCR HI TESTER 3532-50 from HIOKI E.E. CORPORATION), and the sample was heated to a predetermined temperature and subjected to impedance measurement. The measurement frequency was 5 MHz to 40 Hz. The measurement was performed at 400° C., 500° C., 600° C., and 700° C. after holding the sample for 15 minutes at each temperature. The measurement was performed 16 times, and their average was defined as a measurement value.

[3. Results]

Table 1 shows sintering temperature, bulk density, and ion conductivity. Table 1 reveals the following.

(1) $Ca_3Fe_2Ge_3O_{12}$ containing no dopant (Example 1) serves as an oxide ion conductor but has lower ion conductivity than YSZ.

(2) $Ca_{2.4}La_{0.6}Fe_2Ge_3O_{12}$ (Examples 2 to 4) has ion conductivity depending on the sintering temperature. In the case of sintering temperature of 1300° C., the ion conductivity is similar at 700° C. but high at 400 to 600° C. compared with ion conductivity of YSZ.

(3) $Ca_3Fe_2Ge_{2.4}Al_{0.6}O_{12}$ (Examples 5 and 6) has ion conductivity slightly low at 700° C. but high at 400 to 500° C. compared with ion conductivity of YSZ.

(4) Since conductivity in the atmosphere is substantially not different from that in a nitrogen flow (oxygen concentration 10 ppm), electron conduction does not contribute to the conductivity of each sample of Examples 1 to 6.

TABLE 1

| | Nominal composition | Sintering temperature (° C.) | Bulk density (Mg/m$^3$) | Ion conductivity (S/cm) | | | | | |
|---|---|---|---|---|---|---|---|---|---|
| | | | | 400° C. | 500° C. | 600° C. | 700° C. | 600° C. N$_2$ flow | 700° C. N$_2$ flow |
| Comparative example 1 | YSZ | | | 3.0E−05 | 5.0E−04 | 3.0E−03 | 1.0E−02 | 3.0E−03 | 1.0E−02 |
| Example 1 | Ca$_3$Fe$_2$Ge$_3$O$_{12}$ | 1350 | 4.51 | 6.8E−07 | 5.4E−06 | 3.1E−05 | 1.3E−04 | | 1.4E−04 |
| Example 2 | Ca$_{2.4}$La$_{0.6}$Fe$_2$Ge$_3$O$_{12}$ | 1200 | 4.72 | 4.2E−04 | 1.8E−03 | 4.1E−03 | 7.3E−03 | | |
| Example 3 | | 1250 | 4.22 | 1.1E−04 | 2.2E−04 | 5.7E−04 | 1.5E−03 | | 1.9E−03 |
| Example 4 | | 1300 | 4.54 | 1.2E−03 | 2.1E−03 | 4.5E−03 | 8.3E−03 | 4.7E−03 | 8.3E−03 |
| Example 5 | Ca$_3$Fe$_2$Ge$_{2.4}$Al$_{0.6}$O$_{12}$ | 1200 | 4.31 | 1.4E−04 | 3.6E−04 | 7.7E−04 | 1.7E−03 | | |
| Example 6 | | 1300 | 4.19 | 4.6E−04 | 9.4E−04 | 1.6E−03 | 2.9E−03 | 1.4E−03 | 2.7E−03 |

Example 7

[1. Investigation of Base Composition by Quantum-Mechanical Calculation]

Synthesis capability of the oxide having the X$_3$Z$_2$(TO$_4$)$_3$ structure was investigated in terms of energy stability by quantum-mechanical calculation. Ca, Fe, Gd, Ba, or Sr was selected as the element X (positive divalent). Al, Cr, Fe, Mn, V, Ga, Co, Ni, Ru, Rh, or Ir was selected as the element Z (positive trivalent). Si, Ge, or Sn was selected as the element T (positive tetravalent).

A reaction expressed by Formula (3) was assumed as the synthesis reaction, and heat of formation for the reaction was determined according to Formula (4) by quantum-mechanical calculation.

$$3XO + Z_2O_3 + 3TO_2 \rightarrow X_3Z_2(TO_4)_3 \quad (3)$$

$$\text{Heat of formation} = E(X_3Z_2(TO_4)_3) - 3E(XO) - E(TO_2) \quad (4)$$

[2. Results]

Based on the Ca$_3$Fe$_2$Ge$_3$O$_{12}$, which is found herein, another element was wholly substituted for one of the elements Ca, Fe, and Ge. Table 2 shows heat of formation for the substitution. When heat of formation is negative, the relevant oxide X$_3$Z$_2$(TO$_4$)$_3$ is stable and synthesizable. That is, the element that can be wholly substituted may become a main constituent element (X, Z, or T) of the oxide X$_3$Z$_2$(TO$_4$)$_3$. Table 2 reveals the following.

(1) For the element X (positive divalent), Gd, Ba, and Sr can each be wholly substituted for Ca. Fe can be partially substituted for Ca while not wholly substituted.

(2) For the element Z (positive trivalent), Al, Cr, Mn, V, Ga, Co, Ni, Ru, Rh, and Ir can each be wholly substituted for Fe.

(3) For the element T (positive tetravalent), Si can be wholly substituted for Ge, while Sn cannot be wholly substituted for Ge.

(4) For the element X (positive divalent), although no quantum-mechanical calculation is performed for Mn and Mg, substances Mn$_3$V$_2$Si$_3$O$_{12}$ and Mg$_3$V$_2$Si$_3$O$_{12}$ exist. That is, Mn and Mg can each be wholly substituted for Ca.

TABLE 2

| X(+2) | Z(+3) | T(+4) | Reaction | Heat of formation (eV) |
|---|---|---|---|---|
| Ca | Fe | Ge | 3CaO + Fe$_2$O$_3$ + 3GeO$_2$ → Ca$_3$Fe$_2$Ge$_3$O$_{12}$ | −3.24 |
| Ca | Fe | Si | 3CaO + Fe$_2$O$_3$ + 3SiO$_2$ → Ca$_3$Fe$_2$Si$_3$O$_{12}$ | −2.33 |
| Ca | Fe | Sn | 3CaO + Fe$_2$O$_3$ + 3SnO$_2$ → Ca$_3$Fe$_2$Sn$_3$O$_{12}$ | 0.60 |
| Sr | Fe | Ge | 3SrO + Fe$_2$O$_3$ + 3GeO$_2$ → Sr$_3$Fe$_2$Ge$_3$O$_{12}$ | −3.68 |
| Ba | Fe | Ge | 3BaO + Fe$_2$O$_3$ + 3GeO$_2$ → Ba$_3$Fe$_2$Ge$_3$O$_{12}$ | −2.78 |
| Gd | Fe | Ge | 3GdO + Fe$_2$O$_3$ + 3GeO$_2$ → Gd$_3$Fe$_2$Ge$_3$O$_{12}$ | −4.74 |
| Fe | Fe | Ge | 3FeO + Fe$_2$O$_3$ + 3SiO$_2$ → Fe$_3$Fe$_2$Ge$_3$O$_{12}$ | 1.75 |
| Ca | Al | Ge | 3CaO + Al$_2$O$_3$ + 3GeO$_2$ → Ca$_3$Al$_2$Ge$_3$O$_{12}$ | −3.42 |
| Ca | Ga | Ge | 3CaO + Ga$_2$O$_3$ + 3GeO$_2$ → Ca$_3$Ga$_2$Ge$_3$O$_{12}$ | −3.41 |
| Ca | V | Ge | 3CaO + V$_2$O$_3$ + 3SiO$_2$ → Ca$_3$V$_2$Ge$_3$O$_{12}$ | −2.88 |
| Ca | Cr | Ge | 3CaO + Cr$_2$O$_3$ + 3SnO$_2$ → Ca$_3$Cr$_2$Ge$_3$O$_{12}$ | −3.44 |
| Ca | Mn | Ge | 3CaO + Mn$_2$O$_3$ + 3GeO$_2$ → Ca$_3$Mn$_2$Ge$_3$O$_{12}$ | −2.92 |
| Ca | Co | Ge | 3CaO + Co$_2$O$_3$ + 3GeO$_2$ → Ca$_3$Co$_2$Ge$_3$O$_{12}$ | −1.13 |
| Ca | Ni | Ge | 3CaO + Ni$_2$O$_3$ + 3GeO$_2$ → Ca$_3$Ni$_2$Ge$_3$O$_{12}$ | −1.75 |
| Ca | Ru | Ge | 3CaO + Ru$_2$O$_3$ + 3GeO$_2$ → Ca$_3$Ru$_2$Ge$_3$O$_{12}$ | −2.33 |
| Ca | Rh | Ge | 3CaO + Rh$_2$O$_3$ + 3GeO$_2$ → Ca$_3$Rh$_2$Ge$_3$O$_{12}$ | −2.90 |
| Ca | Ir | Ge | 3CaO + Ir$_2$O$_3$ + 3SiO$_2$ → Ca$_3$Ir$_2$Ge$_3$O$_{12}$ | −3.30 |

Example 8

[1. Sample Preparation]

Samples having various compositions were prepared as in Example 1. Nominal compositions of the samples were as follows.

(a) Ca$_{2.7}$La$_{0.3}$Fe$_2$Ge$_3$O$_{12}$ (Example 8.1).

(b) Ca$_{2.8}$La$_{0.2}$Fe$_2$Ge$_3$O$_{12}$ (Example 8.2).

(c) Ca$_3$Fe$_2$Ge$_{2.7}$Al$_{0.3}$O$_{12}$ (Example 8.3).

(d) Ca$_3$Fe$_2$Ge$_{2.8}$Al$_{0.2}$O$_{12}$ (Example 8.4).

(e) Ca$_3$Fe$_{1.6}$Zn$_{0.4}$Ge$_3$O$_{12}$ (Example 8.5).

(f) Ca$_3$Fe$_{1.6}$Zn$_{0.4}$Ge$_{2.4}$Al$_{0.6}$O$_{12}$ (Example 8.6).

[2. Test Method]

Bulk density and ion conductivity were measured as in Example 1.

[3. Results]

Table 3 shows sintering temperature, sintering time, bulk density, and ion conductivity.

TABLE 3

| | Nominal composition | Sintering temperature (° C.) | Sintering time (h) | Bulk density (Mg/m³) | Ion conductivity (S/cm) | | |
|---|---|---|---|---|---|---|---|
| | | | | | 500° C. | 600° C. | 700° C. |
| Example 8.1 | $Ca_{2.7}La_{0.3}Fe_2Ge_3O_{12}$ | 1300 | 1 | 4.19 | 3.0E−04 | 6.4E−04 | 1.0E−03 |
| Example 8.2 | $Ca_{2.8}La_{0.2}Fe_2Ge_3O_{12}$ | 1250 | 1 | 3.81 | 8.6E−05 | 1.9E−04 | 3.5E−05 |
| Example 8.3 | $Ca_3Fe_2Ge_{2.7}Al_{0.3}O_{12}$ | 1300 | 1 | 4.39 | 1.9E−06 | 4.2E−06 | 9.7E−06 |
| Example 8.4 | $Ca_3Fe_2Ge_{2.8}Al_{0.2}O_{12}$ | 1300 | 1 | 4.40 | 6.1E−07 | 2.2E−06 | 6.7E−06 |
| Example 8.5 | $Ca_3Fe_{1.6}Zn_{0.4}Ge_3O_{12}$ | 1350 | 1 | 4.43 | 2.4E−10 | 4.0E−09 | 3.4E−08 |
| Example 8.6 | $Ca_3Fe_{1.6}Zn_{0.4}Ge_{2.4}Al_{0.6}O_{12}$ | 1200 | 1 | 3.81 | 7.2E−09 | 6.2E−08 | 3.0E−07 |

Example 9

[1. Investigation of Base Composition by Quantum Calculation]

Investigation was made by quantum chemical calculation on ion conductivity of the oxide having the $X_3Z_2(TO_4)_3$ structure, where X (positive divalent) was Ca or Mg, Z (positive trivalent) was Al, Fe, or Ga, and T (positive tetravalent) was Si or Ge.

[2. Results]

The oxide ion conductivity is determined by a diffusion barrier against migration of the oxide ion. The diffusion barrier of 0.5 eV or less provides high conductivity. Calculation results revealed that, for the materials, the diffusion barrier was lower against migration of interstitial oxygen ($O_i$) than against migration of oxygen vacancy ($V_o$). Based on this, formation energy ($E_{form}$: the lower its value is, the more stable) was calculated for each of the oxygen vacancy ($V_o$) and the interstitial oxygen ($O_i$).

Figure 2:
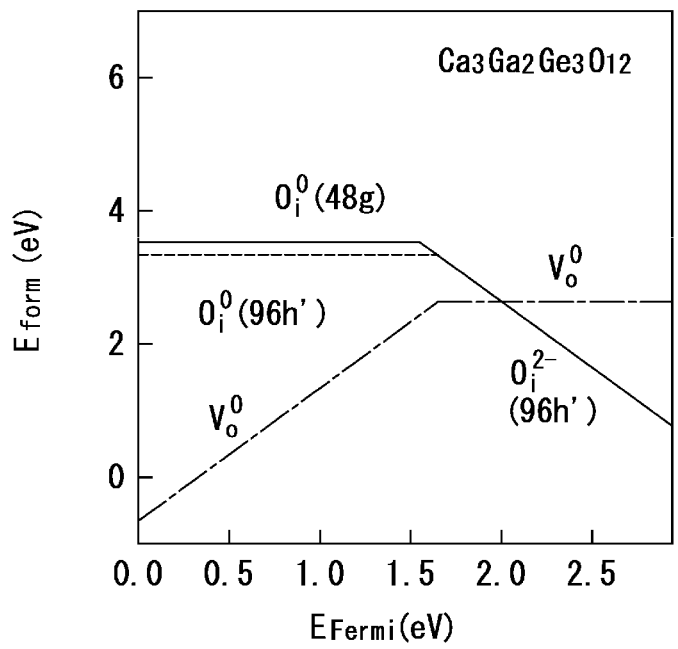
FIG. 2 illustrates a relationship between formation energy and the Fermi level of $Ca_3Ga_2Ge_3O_{12}$.

FIG. 1 shows a relationship between formation energy and the Fermi level of $Ca_3Fe_2Ge_3O_{12}$. FIG. 2 shows a relationship between formation energy and the Fermi level of $Ca_3Ga_2Ge_3O_{12}$. FIGS. 1 and 2 each reveal that the interstitial oxygen ($O_i$) is stable regardless of a material system at a Fermi energy ($E_{Fermi}$: the origin is the upper end of the valence band) of 2.0 eV or more. The Fermi energy can be varied within a bandgap of a material by doping into the material or introducing deficiencies. A bandgap of 2.0 eV or more was therefore determined to be necessary.

Table 4 shows calculation results of a diffusion barrier (Total $E_{mig}$) against the interstitial oxygen ($O_i$) and bandgap ($E_g$). Total $E_{mig}$ represents an energy barrier against migration of the oxide ion. A value of Total $E_{mig}$ of less than 0.5 eV provides high ion conductivity. $E_g$ represents the bandgap obtained using the PBE functional. Table 4 reveals that the materials each satisfy the above-described conditions for the oxide ion conductor exhibiting high conductivity.

TABLE 4

| Name | Total Emig (eV) | Eg (eV) |
|---|---|---|
| $Ca_3Fe_2Ge_3O_{12}$ | 0.45 | 2.2 |
| $Mg_3Al_2Si_3O_{12}$ | 0.28 | 5.0 |
| $Mg_3Ga_2Ge_3O_{12}$ | 0.41 | 2.8 |
| $Ca_3Ga_2Ge_3O_{12}$ | 0.45 | 3.0 |

Although the embodiment of the present invention has been described in detail hereinbefore, the present invention is not limited thereto, and various modifications may be made within the scope without departing form the gist of the present invention.

The oxide ion conductor of the present invention can be used as a solid electrolyte used for a solid-oxide fuel cell (SOFC), an oxygen gas sensor, and an exhaust gas purification element.

What is claimed is:

1. An oxide ion conductor, comprising an oxide having a $X_3Z_2(TO_4)_3$ structure, where X is a divalent metal element, Z is a trivalent metal element, and T is a tetravalent metal element, the oxide ion conductor having a composition expressed by Formula (1)

$$(X_{1-x}A_x)_3(Z_{1-y}B_y)_2(T_{1-z}C_z)_3O_{12+\delta} \quad (1)$$

where (a) the element X is Mg, the element Z is Al, and the element T is Si, (b) the element X is Mg, the element Z is Ga, and the element T is Ge, or (c) the element X is Ca, the element Z is Ga, and the element T is Ge, an element A is different from the element X and at least one element selected from a group consisting of La, Pr, Nd, Sm, Eu, Gd, Tb, Dy, Ho, Er, Tm, Yb, Lu, and Sr, an element B is different from the element Z and at least one element selected from a group consisting of Zn, Mn, Co, Ru, and Rh, an element C is different from the element T and at least one element selected from a group consisting of Si, Al, Ga, and Sn, $0 \leq x \leq 0.2$, $0 \leq y \leq 0.2$, and $0 \leq z \leq 0.2$ are satisfied, and $\delta$ is a value securing electrical neutrality.

2. An oxide ion conductor, comprising an oxide having a $X_3Z_2(TO_4)_3$ structure, where X is a divalent metal element, Z is a trivalent metal element, and T is a tetravalent metal element, the oxide ion conductor having a composition expressed by Formula (1.1)

$$(Ca_{1-x}A_x)_3(Fe_{1-y}B_y)_2(Ge_{1-z}C_z)_3O_{12+\delta} \quad (1.1)$$

where the element A is at least one element selected from a group consisting of La, Pr, Nd, Sm, Eu, Gd, Tb, Dy, Ho, Er, Tm, Yb, Lu, and Sr, the element B is at least one element selected from a group consisting of Zn, Mn, Co, Ru, and Rh, the element C is at least one element selected from a group consisting of Si, Al, Ga, and Sn, $0 \leq x \leq 0.2$, $0 \leq y \leq 0.2$, and $0 \leq z \leq 0.2$ are satisfied, with the proviso that at least one of x, y and z is at least 0.01, and $\delta$ is a value securing electrical neutrality.

3. An electrochemical device including the oxide ion conductor according to claim 1.

4. An electrochemical device including the oxide ion conductor according to claim 2.

* * * * *